(12) United States Patent
White et al.

(10) Patent No.: US 12,117,995 B1
(45) Date of Patent: *Oct. 15, 2024

(54) METHODS FOR VERIFYING VECTOR DATABASE QUERY RESULTS AND DEVICES THEREOF

(71) Applicant: SPACE AND TIME LABS, INC., San Clemente, CA (US)

(72) Inventors: Jay Thomas White, Lexington, KY (US); Scott Edward Daly Dykstra, Fort Myers, FL (US)

(73) Assignee: SPACE AND TIME LABS, INC., San Clemente, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/620,214

(22) Filed: Mar. 28, 2024

Related U.S. Application Data

(63) Continuation of application No. 18/388,586, filed on Nov. 10, 2023, now Pat. No. 11,947,525.

(51) Int. Cl.
*G06F 16/23* (2019.01)
*G06F 16/22* (2019.01)
*G06F 16/2455* (2019.01)

(52) U.S. Cl.
CPC ...... *G06F 16/2379* (2019.01); *G06F 16/2237* (2019.01); *G06F 16/2455* (2019.01)

(58) Field of Classification Search
CPC ............ G06F 16/2379; G06F 16/2237; G06F 16/2455
See application file for complete search history.

(56) References Cited

U.S. PATENT DOCUMENTS

2024/0022416 A1\* 1/2024 Pindado Tost ...... G06F 21/6245

\* cited by examiner

*Primary Examiner* — Robert W Beausoliel, Jr.
*Assistant Examiner* — Mohammad S Bhuyan
(74) *Attorney, Agent, or Firm* — Troutman Pepper Hamilton Sanders LLP (57) ABSTRACT

Methods, non-transitory computer-readable media, and query verification apparatuses are disclosed that receive a result vector, an index to the result vector, a range proof, and an inner product proof from a prover device after providing a query vector to the prover device. The prover device hosts a vector database with rows and columns. Second and third commitments to a distance vector and a random linear combination vector, respectively, are generated based on a first commitment to the rows. The range proof is checked using the second commitment and the inner product proof is checked using the third commitment and a generator used to generate the first commitment and identified based on the index. The result vector is returned after confirming that it is one of the rows and each of the rows is as far from the query vector as the result vector based on the check of the proofs.

20 Claims, 6 Drawing Sheets

METHODS FOR VERIFYING VECTOR DATABASE QUERY RESULTS AND DEVICES THEREOF

This application is a continuation of U.S. patent application Ser. No. 18/388,586, filed Nov. 10, 2023, which is incorporated by reference herein in its entirety.

FIELD

This technology generally relates to outsourced (e.g., third-party or decentralized) database security and, more particularly, to methods and devices for verifying outsourced vector database query results to mitigate tampering of the stored underlying data and the execution of a query.

BACKGROUND

Outsourced or third-party databases are increasingly utilized for data storage and retrieval in many applications, including artificial intelligence. Applications that involve large language models and generative artificial intelligence, for example, rely on vector embeddings that have many attributes representing different dimensions of data and are essential for understanding patterns, relationships, and underlying structures. Specialized vector databases have been developed that optimize storage and querying capabilities and provide improved performance, scalability, and flexibility for vector embedding data as compared to traditional scalar-based databases.

However, third-party owners of the resources hosting outsourced vector databases may have the ability to tamper with the stored data or the query results sent from those databases. In some applications, bad actors are incentivized by the nature of the stored data and/or the downstream consumers that rely on correct vector database query results (e.g., smart contracts that may release or manage cryptocurrency funds).

While both centralized and decentralized vector databases can be untrustworthy, in a completely decentralized topology, anyone can act as a vector database host, which increases the risk of tampering and decreases the trustworthiness of returned query results. Unfortunately, there is currently no efficient way to prove vector database query results that are executed against data maintained by an outsourced vector database hosted on resources provided by untrusted third-party network participant(s).

SUMMARY

In one example, a method for verifying vector database query results is disclosed that is implemented by a query verification apparatus and includes receiving a result vector, a first index to the result vector, a range proof, and an inner product proof from one or more prover devices after providing a query vector to the one or more prover devices. The one or more prover devices host a vector database comprising rows and columns. Second and third commitments to a distance vector and a random linear combination vector, respectively, are generated based on a stored first commitment to the rows. The range proof is checked using the second commitment and the inner product proof is checked using the third commitment and one of a plurality of generators used to generate the first commitment. The one of the generators is identified based on the first index. The result vector is returned after confirming the result vector is one of the rows, and each of the rows is at least as far from the query vector as the result vector, based on the check of the inner product and range proofs, respectively.

In another example, a query verification apparatus is disclosed that includes memory having instructions stored thereon and one or more processors coupled to the memory and configured to execute the stored instructions to receive a result vector, a first index to the result vector, a range proof, and an inner product proof from one or more prover devices after providing a query vector to the one or more prover devices. The one or more prover devices host a vector database comprising rows and columns. Second and third commitments to a distance vector and a random linear combination vector, respectively, are generated based on a stored first commitment to the rows. The range proof is checked using the second commitment and the inner product proof is checked using the third commitment and one of a plurality of generators used to generate the first commitment. The one of the generators is identified based on the first index. The result vector is returned after confirming the result vector is one of the rows and each of the rows is at least as far from the query vector as the result vector based on the check of the inner product and range proofs, respectively.

In yet another example, a non-transitory computer-readable medium having stored thereon instructions for verifying vector database query results is disclosed that includes executable code that, when executed by one or more processors, causes the one or more processors to receive a result vector, a first index to the result vector, a range proof, and an inner product proof from one or more prover devices after providing a query vector to the one or more prover devices. The one or more prover devices host a vector database comprising rows and columns. Second and third commitments to a distance vector and a random linear combination vector, respectively, are generated based on a stored first commitment to the rows. The range proof is checked using the second commitment and the inner product proof is checked using the third commitment and one of a plurality of generators used to generate the first commitment. The one of the generators is identified based on the first index. The result vector is returned after confirming the result vector is one of the rows and each of the rows is at least as far from the query vector as the result vector based on the check of the inner product and range proofs, respectively.

This technology provides several advantages including methods, non-transitory computer-readable media, and query verification apparatuses that advantageously facilitate trust for query results generated from untrusted centralized and decentralized vector database hosts. In some examples, this technology leverages commitments generated by a verifier device (e.g., a client device or a third-party intermediary or gateway) that does not have access to the data stored in the vector database to verify the accuracy of result vectors returned by applied artificial intelligence models in response to query vectors. Accordingly, this technology more effectively and efficiently provides secure verification of queries to vector databases

DETAILED DESCRIPTION

Figure 1:
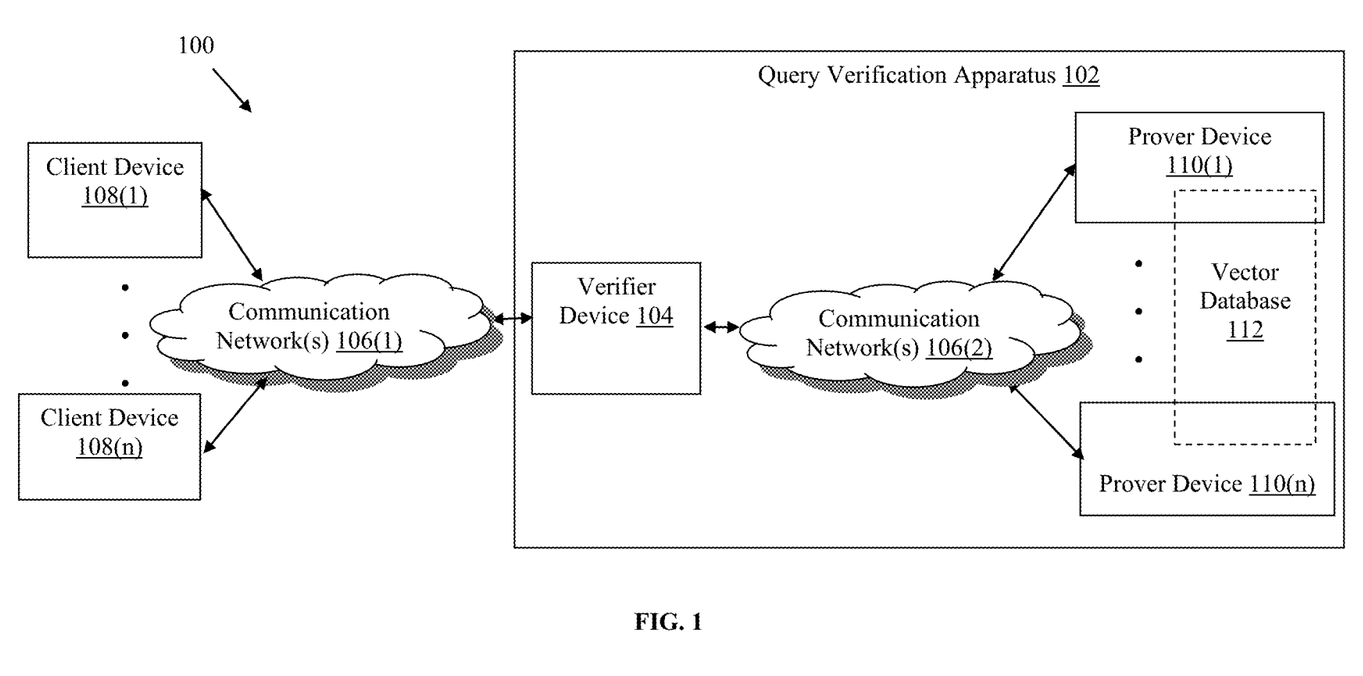
FIG. 1 is a block diagram of an exemplary network environment with a query verification apparatus that includes a verifier device and prover devices.

Referring to FIG. 1, an exemplary network environment 100 is illustrated that includes a query verification apparatus 102 with a verifier device 104 coupled, via communication network(s) 106(1), to client devices 108(1)-108(n) and, via communication network(s) 106(2), to prover devices 110(1)-110(n) hosting a vector database 112. The network environment 100 may include other network devices such as one or more routers or switches, for example, which are known in the art and thus will not be described herein. This technology provides several advantages including methods, non-transitory computer readable media, and devices that ingest data and return query results with improved security to effectively transform untrusted outsourced vector databases into trusted vector databases.

In this example, the client devices 108(1)-108(n), verifier device 104, and prover devices 110(1)-110(n) are disclosed in FIG. 1 as dedicated hardware devices. However, one or more of the client devices 108(1)-108(n), verifier device 104, or prover devices 110(1)-110(n) can also be implemented in software within one or more other devices in the network environment 100. As one example, the verifier device 104, as well as any of its components or applications, can be implemented as software executing on one of the client devices 108(1)-108(n), and many other permutations and types of implementations and network topologies can also be used in other examples.

Figure 2:
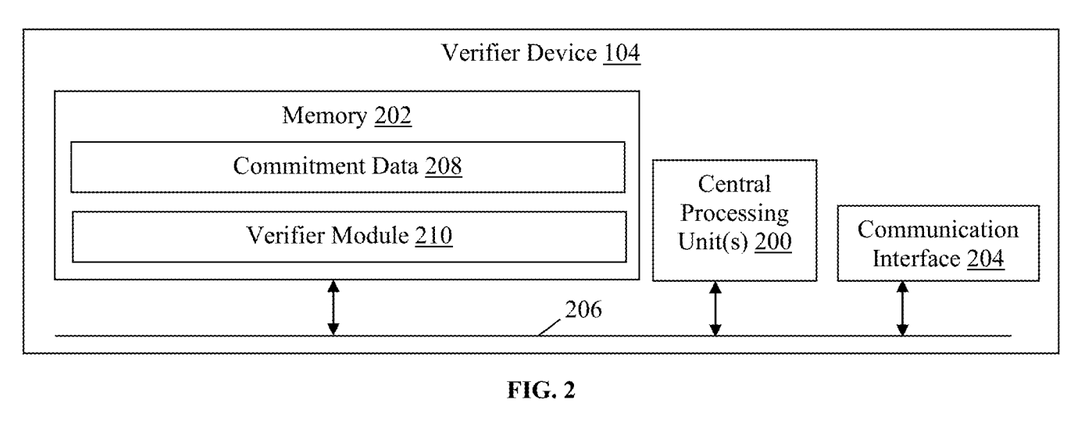
FIG. 2 is a block diagram of an exemplary verifier device.

Referring to FIGS. 1-2, the verifier device 104 of the query verification apparatus 102 may perform any number of functions, including providing interfaces to the client devices 108(1)-108(n) for ingesting data to be stored in the vector database 112 hosted by the prover devices 110(1)-110(n) and processing query results from the prover devices 110(1)-110(n). The verifier device 104 in this example includes central processing unit(s) (CPU(s)) 200, memory 202, and a communication interface 204, which are coupled together by a bus 206, although the verifier device 104 can include other types or numbers of elements in other configurations.

The CPU(s) 200 of the verifier device 104 may execute programmed instructions stored in the memory 202 of the verifier device 104 for any number of the functions described and illustrated herein. The CPU(s) 200 may include one or more general purpose processors with one or more processing cores, for example, although other types of processor(s) including graphics processing units (GPUs) can also be used.

The memory 202 stores these programmed instructions for one or more aspects of the present technology as described and illustrated herein, although some or all of the programmed instructions could be stored elsewhere. A variety of different types of memory storage devices, such as random-access memory (RAM), read only memory (ROM), hard disk, solid state drives, flash memory, or other computer-readable medium which is read from and written to by a magnetic, optical, or other reading and writing system that is coupled to the CPU(s) 200, can be used for the memory 202.

Accordingly, the memory 202 can store applications that can include computer executable instructions that, when executed by the CPU(s) 200, cause the verifier device 104 to perform actions, such as to transmit, receive, or otherwise process network messages and requests, for example, and to perform other actions described and illustrated below. The application(s) can be implemented as components of other applications, operating system extensions, and/or plugins, for example.

Further, the application(s) may be operative in a cloud-based computing environment with access provided via a software-as-a-service (SaaS) model. The application(s) can be executed within or as virtual machine(s) or virtual server(s) that may be managed in a cloud-based computing environment. Also, the application(s), and even the verifier device 104 itself, may be in virtual server(s) running in a cloud-based computing environment rather than being tied to specific physical network computing devices. Also, the application(s) may be running in virtual machines (VMs) executing on the verifier device and managed or supervised by a hypervisor.

In this example, the memory 202 includes commitment data 208 and a verifier module 210. The verifier module 210 is configured to generate commitments upon ingesting query vectors, as described and illustrated in more detail below. The commitment data 208 is used by the verifier module 210 to verify result vectors returned from the prover devices 110(1)-110(n), also as described and illustrated in more detail below. Other information can be stored in the memory 202 in other examples, and other data stores and/or applications or modules also can be hosted by the verifier device 104 in other examples.

The communication interface 204 of the verifier device 104 operatively couples and communicates between the verifier device 104, client devices 108(1)-108(n), and prover devices 110(1)-110(n), which are coupled together at least in part by the communication network(s) 106(1)-106(2) in this particular example, although other types or numbers of communication networks or systems with other types or numbers of connections or configurations to other devices or elements can also be used. The communication network(s) 106(1)-106(2) can be wide area network(s) (WAN(s)) and/or local area network(s) (LAN(s)), for example, and can use TCP/IP over Ethernet and industry-standard protocols, although other types or numbers of protocols or communication networks can also be used. The communication network(s) 106(1)-106(2) can employ any suitable interface mechanisms and network communication technologies including, for example, Ethernet-based Packet Data Networks (PDNs).

While the verifier device 104 is illustrated in this example as including a single device, the verifier device 104 in other examples can include a plurality of devices each having one or more processors (each processor with one or more processing cores) that implement one or more steps of this technology. In these examples, one or more of the devices can have a dedicated communication interface or memory. Alternatively, one or more of the devices can utilize the memory, communication interface, or other hardware or software components of one or more other devices included in the verifier device 104. Additionally, one or more of the devices that together comprise the verifier device 104 in other examples can be standalone devices or integrated with one or more other devices (e.g., one of the client devices 108(1)-108(n)) or apparatuses.

Figure 3:
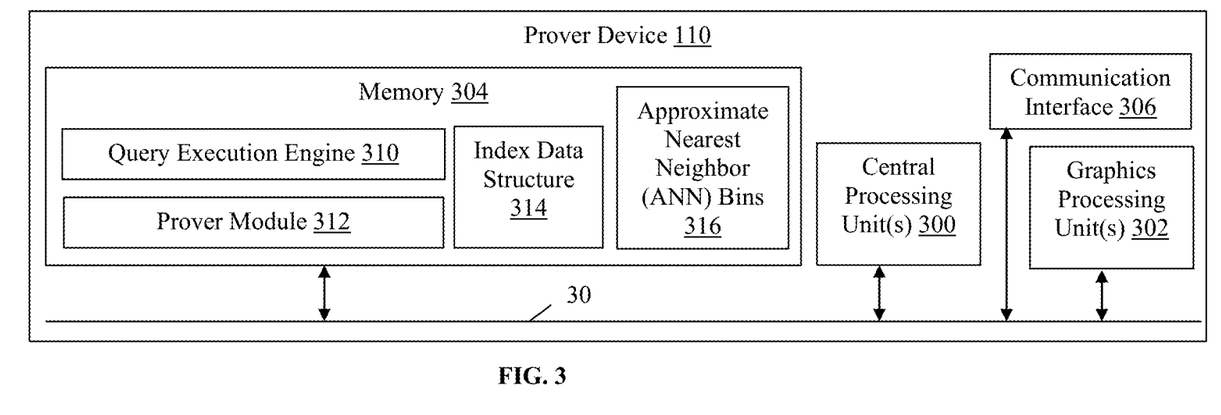
FIG. 3 is a block diagram of an exemplary prover device.

Referring more specifically to FIGS. 1 and 3, the prover device 110 of the query verification apparatus 102 may perform any number of functions, including hosting the vector database 112, processing queries to generate query vector results from the contents of the vector database 112, and generating proofs to facilitate query vector verification by the verifier device 104, for example. The prover device 110 in this example includes CPU(s) 300, GPU(s) 302, memory 304, and a communication interface 306, which are coupled together by a bus 308, although the prover device 110 can include other types or numbers of elements in other configurations.

The CPU(s) 200 and GPU(s) 302 of the prover device 110 may execute programmed instructions stored in the memory 304 for any number of the functions described and illustrated herein. The CPU(s) 200 may include one or more general purpose processors with one or more processing cores, for example, although other types of processor(s) can also be used. The GPU(s) 302 can be configured to process relatively large blocks of data in parallel to accelerate certain processing functions.

The memory 304 stores these programmed instructions for one or more aspects of the present technology as described and illustrated herein, although some or all of the programmed instructions could be stored elsewhere. A variety of different types of memory storage devices, such as RAM, ROM, hard disk, solid state drives, flash memory, or other computer-readable medium which is read from and written to by a magnetic, optical, or other reading and writing system that is coupled to the CPU(s) 300 and/or GPU(s) 302, can be used for the memory 304.

Accordingly, the memory 304 can store applications that can include computer executable instructions that, when executed by the CPU(s) 300 and/or GPU(s) 302, cause the prover device 110 to perform actions, such as to transmit, receive, or otherwise process network messages and requests, for example, and to perform other actions described and illustrated below. The application(s) can be implemented as components of other applications, operating system extensions, and/or plugins, for example.

Further, the application(s) may be operative in a cloud-based computing environment with access provided via a software-as-a-service (SaaS) model. The application(s) can be executed within or as virtual machine(s) or virtual server(s) that may be managed in a cloud-based computing environment. Also, the application(s), and even the prover devices 110(1)-110(n) themselves, may be in virtual server(s) running in a cloud-based computing environment rather than being tied to specific physical network computing devices. Also, the application(s) may be running in VMs executing on the verifier device and managed or supervised by a hypervisor.

In this example, the memory 304 includes a query execution engine 310, a prover module 312, an index data structure, and approximate nearest neighbor (ANN) bins. The query execution engine 310 is configured to execute queries with query vectors received from the client devices 108(1)-108(n) against the vector database 112 and generate a result vector. In some examples, the vector database 112 indexes, stores, and provides access to structured or unstructured data (e.g., text or images) alongside its vector embeddings as vectors or arrays that form rows with columns of the vector database 112 representing dimensions.

The prover module 312 is configured to generate proofs that can be provided to the verifier device 104 along with result vectors to facilitate verification of the query results by the verifier device 104, as described and illustrated in more detail below. The technology described and illustrated herein can support ANN or exact nearest neighbor (ENN) implementations. In an ANN deployment, performance is improved at the cost of accuracy and the prover device 110 includes the optional index data structure 314 and ANN bins 316.

The index data structure allows for fast lookup of the nearest vector neighbors to a query vector. Specifically, the index data structure stores indices (e.g., locality-sensitive hashing indices) to the ANN bins 316, which can be generated from query vectors. In one example, the index data structure 314 can be a structured query language (SQL) database, although the index data structure 314 can be a NoSQL or other type of database in other examples.

Each of the ANN bins 316 contains a list of vectors and the ANN bins 316 collectively form the vector database 112. The ANN bins 316 are chosen such that data vectors (also referred to herein as rows) in the same bin are likely to be close to each other, which allows for fast lookup of the nearest neighbors because instead of searching all of the data vectors, only the data vectors in the same bin as the query vector need to be searched, as explained in more detail below. Other information can be stored in the memory 304 in other examples, and other data stores and/or applications or modules also can be hosted by the prover device 110 in other examples.

The communication interface 306 of the prover device 110 operatively couples and communicates between the verifier device 104 and other of the prover devices 110(1)-110(n), which are coupled together at least in part by communication network(s) (e.g., a WAN or LAN(s)) (not shown) or a direct connection, for example. In some examples, the prover devices 110(1)-110(n) are database servers deployed in a decentralized network and communicated across communication network(s) and the vector database 112 is a decentralized database, although other types of implementations can also be used. Additionally, other types or numbers of networks and connections with other types or numbers of configurations to other devices or elements can also be used in other examples.

Each of the client devices 108(1)-108(n) of the network environment 100 in this example includes any type of computing device that can exchange network data, such as mobile, desktop, laptop, or tablet computing devices, server devices, virtual machines (including cloud-based computers), or the like. Each of the client devices 108(1)-108(n) includes a processor, memory, and a communication interface, which are coupled together by a bus or other communication link (not illustrated), although other numbers or types of components could also be used.

Each of the client devices 108(1)-108(n) may run services and/or interface applications, such as standard web browsers or the standalone applications, which may provide an interface to communicate with the verifier device 104 via the communication network(s) 106. Each of the client devices 108(1)-108(n) may further include a display device, such as a display screen or touchscreen, or an input device, such as a keyboard or mouse, for example (not shown).

Although the exemplary network environment 100 with the client devices 108(1)-108(n), verifier device 104, prover devices 110(1)-110(n), and communication network(s) 106(1)-106(2) are described and illustrated herein, other types or numbers of systems, devices, components, or elements in other topologies can be used. It is to be understood that the systems of the examples described herein are for exemplary purposes, as many variations of the specific hardware and software used to implement the examples are possible, as will be appreciated by those skilled in the relevant art(s).

One or more of the components depicted in the network environment 100, such as the client devices 108(1)-108(n), verifier device 104, or prover devices 110(1)-110(n), for example, may be configured to operate as virtual instances on the same physical machine. In other words, one or more of the client devices 108(1)-108(n), verifier device 104, or prover devices 110(1)-110(n) may operate on the same physical device rather than as separate devices communicating through the communication network(s) 106(1) and/or 106(2) Additionally, there may be more or fewer client devices, verifier devices, or prover devices than illustrated in FIG. 1.

The examples of this technology may also be embodied as one or more non-transitory computer-readable media having instructions stored thereon, such as in the memory 202 and/or 304, for one or more aspects of the present technology, as described and illustrated by way of the examples herein. The instructions in some examples include executable code that, when executed by one or more processors, such as the CPU(s) 200 and/or 300 and/or GPU(s) 302, cause the processors to carry out steps necessary to implement the methods of the examples of this technology that will now be described and illustrated herein.

Figure 4:
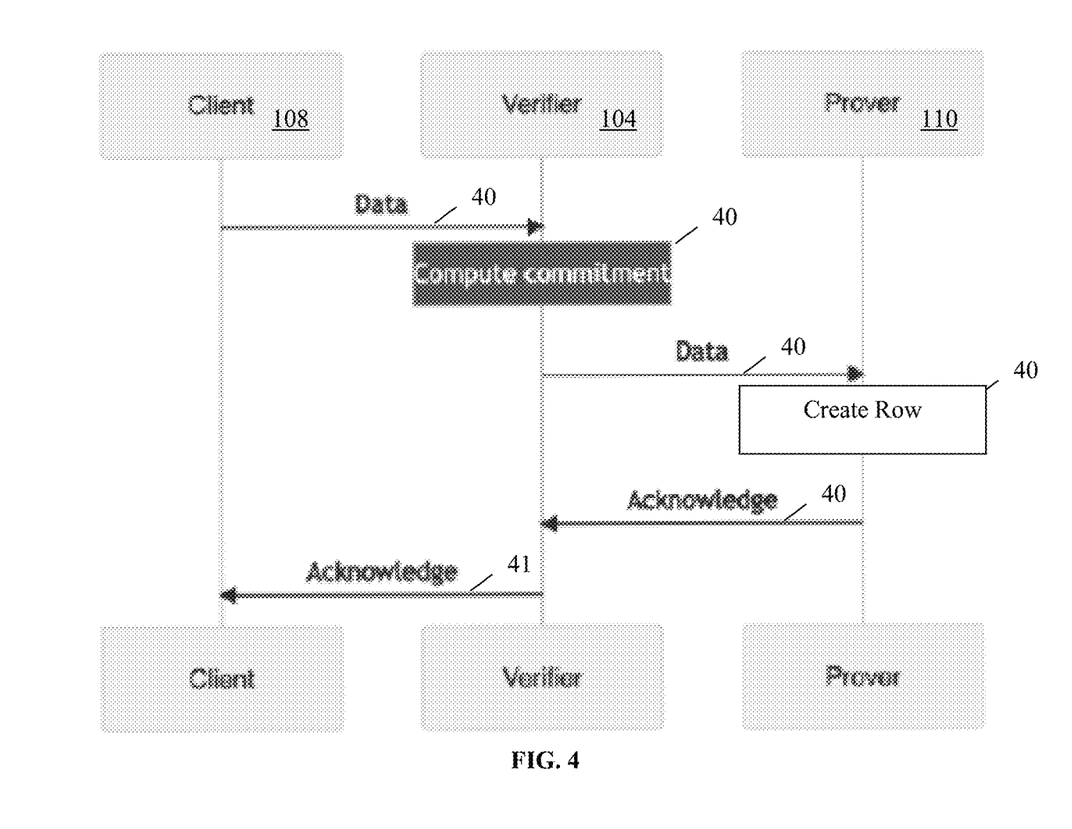
FIG. 4 is a timing diagram of an exemplary method for ingesting data to facilitate vector database query result verification.

Referring now to FIG. 4, a timing diagram of an exemplary method for ingesting data to facilitate vector database query result verification is illustrated. In step 400 in this example, a client device 108 sends a request via the communication network(s) 106 to store data included with the request in the vector database 112 hosted at least in part by the prover device 110. Accordingly, in this example, the verifier device 104 is effectively a gateway disposed between the client device 108 and the prover device 110. However, in other examples, the verifier device 104 could be integral with and/or hosted by the client device 108, and other types of deployments can also be used.

In step 402, the verifier device 104 of the query verification apparatus 102 receives or intercepts the request from the client device 108 and generates and stores locally (e.g., in the memory 304) a first commitment to the data vector associated with the request. The first commitment in this example is a relatively small "digest" of the data vector, which holds sufficient information to subsequently ensure that the data vector is not tampered with, as described and illustrated in more detail below along with an exemplary commitment scheme.

In step 404, the verifier device 104 sends the data vector to the prover device 110 of the query verification apparatus 102 for storage in the vector database 112. In step 406, the prover device 110 creates a row in the vector database 112 and inserts the data vector into the row. In step 408, the prover device 110 optionally sends an acknowledgement to the verifier device 104, which, in step 410, optionally sends another acknowledgement to the client device 108 indicating that storage of the requested data vector in the vector database 112 was successful.

In the examples described and illustrated herein, the first commitment is advantageously updatable by the verifier device 104 without requiring the verifier device 104 to access to the existing data in the vector database 112, as will be explained below with reference to FIG. 5. In this example, G is a cryptographically secure elliptic curve group with a scalar field F, and the data vectors or rows of the vector database 112 are in the scalar field. The security assumptions required depend on the commitment scheme used in the remainder of the protocol described and illustrated herein. While various commitment schemes use different primitive operations, one exemplary implementation is described below. Thus, the multiplication of an element g∈G with an element f·F is the dot product f·g in this example in which the operation in G is addition, although other operations can also be used.

Additionally, v[i] denotes the ith vector or row in the vector database 112, and q denotes a query vector. Thus, $v_j[i]$ denotes the jth element of the ith row and $q_j$ denotes the jth element of the query vector. So, the cosine similarity between v[i] and q is given by: $\langle v[i],q \rangle = \Sigma_j v_j[i] \cdot q_j$. While cosine similarity is used as a distance metric in some examples described below, other types of distance metrics can also be used in other examples. Additionally, the data vectors or rows in the vector database 112 are unit vectors in the examples described and illustrated herein such that the dot product of any two data vectors is equal to the cosine similarity of the two data vectors, although other types of data vectors can also be used.

Thus, the vector database 112 stores many data vectors v[i], the querier (e.g., the verifier device 104) sends a query vector q, and the vector database 112 returns the data vector or row that has the lowest distance from q. An exact nearest neighbor (ENN) search necessarily gives the closest result, while for example an ANN search gives something that is approximately, but not necessarily exactly, the closest result. An ENN implementation is described with reference to FIGS. 5-7, with modifications subsequently explained for an ANN implementation of the disclosed technology.

Figure 5:
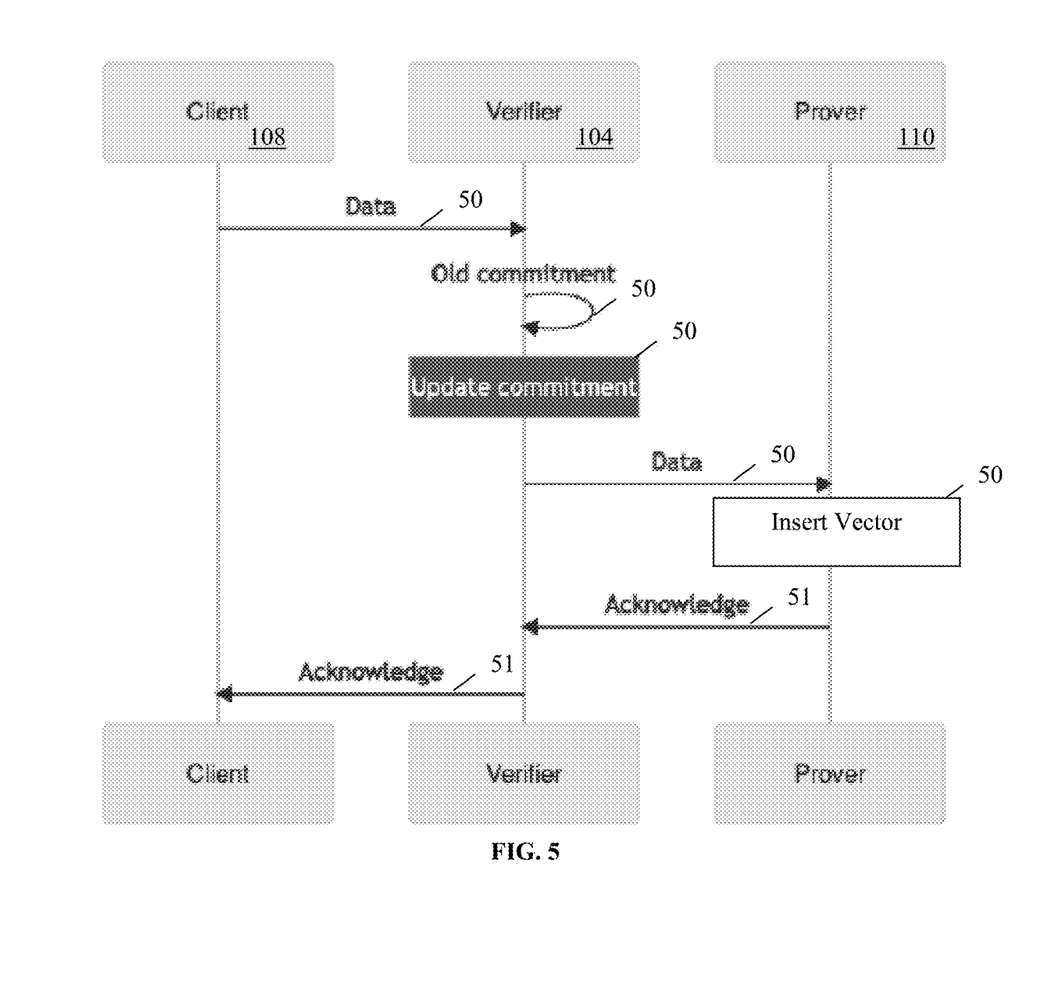
FIG. 5 is a timing diagram of an exemplary method for updating a first commitment following ingest of new vector data.

Referring now to FIG. 5, a timing diagram of an exemplary method for updating a commitment following ingest of a new data vector is illustrated. In step 500 in this example, the client device 108 sends the new data vector as part of a storage request directed to the vector database 112. The new data vector is to be inserted into the vector database 112 as a new row.

In step 502, the verifier device 104 receives the request from the client device 108, retrieves the stored first commitment to the vector database 112 data and, in step 504, updates the retrieved first commitment. In order for the verifier device 104 to combine the retrieved first commitment with the incoming new data vector to create a new first commitment to the entire vector database 112, without access to the existing data stored in the vector database 112, a Pedersen commitment and associated scheme can be used in some examples, although other types of algorithms, whether homomorphic or non-homomorphic) can be used to generate other types of commitments, including KZG commitments, and FRI commitments, for example.

In one example, the Pedersen commitment to the set of data vectors or rows in the vector database 112 is created using a set of generators in a group G in which g[i]∈G denotes the ith generator. The Pedersen commitment to the set of data vectors $\{v[i]\}_{i=0}^{n-1}$ is the number of data vectors, n, along with the tuple $(C_0, \ldots C_{m-1}) \in G^m$, where $(C_0, \ldots C_{m-1})$ is the first commitment, C, to the data in the vector database 112, such that $C_j = v_j[0] \cdot g[0] + \ldots + v_j[n-1] \cdot g[n-1]$.

Pedersen commitments are relatively easily updatable such that all that needs to be done to append to a commitment is to add an extra term to the above sum for each new piece of data. Specifically, when a new data vector, v[n], is added to the vector database 112, the updated commitment element $C^{new}_j$ is $C^{new}_j = C^{old}_j + v_j[n] \cdot g[n]$, where $C^{old}_j$ is the old first commitment. Thus, the updated or new first commitment generated in step 504 is ($C^{new}_0, \ldots, C^{new}_{m-1}$) along with the new number of data vectors or rows n+1. Pedersen commitments are further described in Bootle, J., Cerulli, A., Chaidos, P., Groth, J., Petit, C., "Efficient Zero-Knowledge Arguments for Arithmetic Circuits in the Discrete Log Setting" Fischlin, M., Coron, J S. (eds) Advances in Cryptology—EUROCRYPT 2016. EUROCRYPT 2016. Lecture Notes in Computer Science, vol 9666. Springer, Berlin, Heidelberg, which is incorporated by reference herein in its entirety.

Any other homomorphic commitment scheme that may be used in other examples also has the property of being updatable as described herein. As one example, the KZG commitment scheme can be used and is described in Kate, A., Zaverucha, G. M., Goldberg, I., "Constant-Size Commitments to Polynomials and Their Applications," Abe, M. (eds) Advances in Cryptology—ASIACRYPT 2010. ASIACRYPT 2010. Lecture Notes in Computer Science, vol 6477. Springer, Berlin, Heidelberg, which is incorporated by reference herein in its entirety. Non-homomorphic commitment schemes can also be used in yet other examples.

Accordingly, following the update of the commitment in step 504, the verifier device 104 sends the new data vector to the prover device 110 in step 506. In step 508, the prover device 110 adds a row including the new data vector to the vector database 112. In step 510, the prover device 110 optionally sends an acknowledgement to the verifier device 104, which, in step 512, optionally sends another acknowledgement to the client device 108 indicating that storage of the requested new data vector in the vector database 112 was successful.

The method described and illustrated with reference to FIGS. 6-7 can be used to prove the validity of a result query sent from the prover device 110 in response to a query vector q sent to the prover device 110 from the verifier device 104. In some examples, the vector database 112 supports an artificial intelligence model executed by the verifier device 104 or one of the client devices 108, for example, in which a prompt is ingested in the form of the query vector, which is used to generate and return a result vector. In the description provided below, as well as in reference to FIGS. 6-7, the following notations and equations are utilized in addition to the notations noted above:

$r=(r_0, \ldots, r_{m-1})$ is a random challenge vector.

$b[i]=r_0 \cdot b_0[i]+ \ldots +r_{m-1} \cdot b_{m-1}[i]=\langle r,v[i]\rangle$ is a random linear combination vector reflecting a random linear combination of columns of the vector database 112.

$B=b[i] \cdot g[i]+ \ldots +b[n-1] \cdot g[n-1]$ is a commitment to the b[i]'s, referred to herein as the third commitment, with $B=\langle r,C\rangle =r_0 \cdot C_0+ \ldots +r_{m-1} \cdot C_{m-1}$.

w is the correct or valid result vector (i.e., the data vector or row of the vector database 112 that is closest to q).

k is the index of w (i.e., $w=v[k]$).

$s[i]=\langle q, v[i]\rangle -\langle q, w\rangle$ is a distance vector reflecting how much further v[i] is from q than w. As explained below, s[i] will be positive if w is correct.

$S=q_0 \cdot C_0+ \ldots +q_{m-1} \cdot C_{m-1}-\langle q,w\rangle \cdot (g[0]+ \ldots +g[_{n-1}])$ is a commitment to the s[j]'s, referred to herein as the second commitment.

$e_k$ is the kth standard basis vector in $F^n$ such that $e_k[k]=1$ and $e_k[i]=0$ when $i \neq k$.

g[i] is the ith generator in the set of generators, g.

Figure 6:
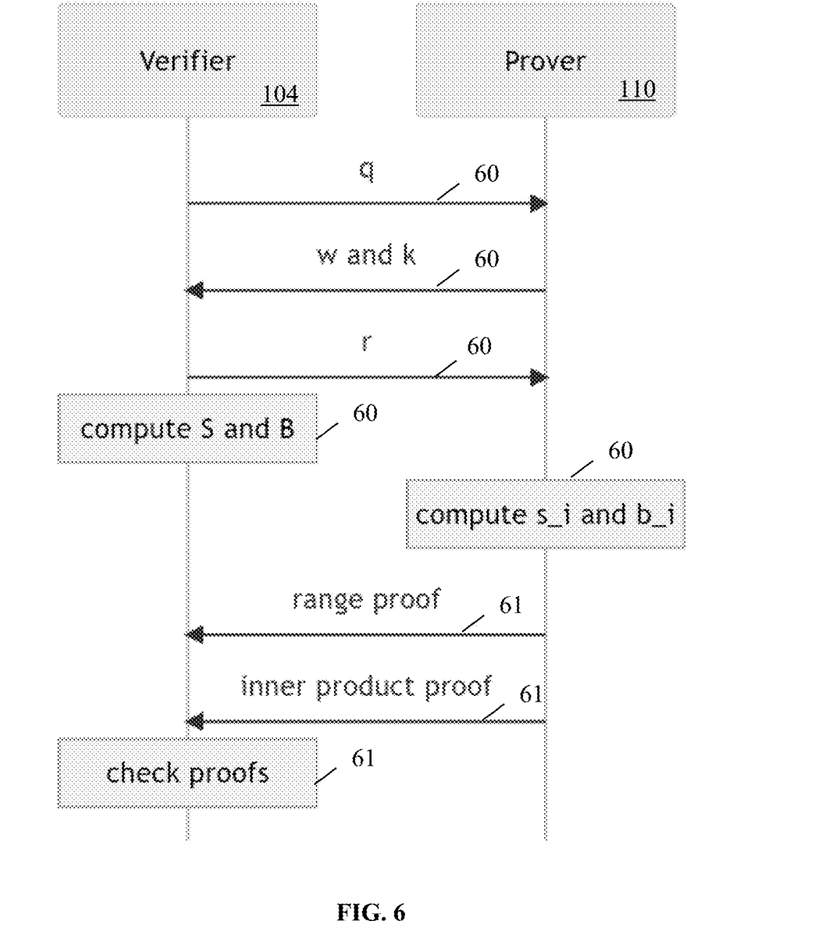
FIG. 6 is a timing diagram of an exemplary method for using a stored commitment to verify a vector database query result.

Referring now to FIG. 6, a timing diagram of an exemplary method for using a stored commitment to verify a database query result is illustrated. In step 600 in this example, the client device 108 sends a query that includes a query vector toward the vector database 112. The verifier device 104 receives the query vector from the client device 108 and forwards the query vector to the prover device 110 hosting at least a portion of the vector database 112.

In step 602, the prover device 110 executes the query, with the query vector received from the verifier device 104, against the vector database 112 using the query execution engine 310 to generate a result vector. The result vector is the closest data vector or row in the vector database 112 to the query vector as determined by the prover device 110. The prover device 110 then sends the result vector and an index to the result vector to the verifier device 104. The index corresponds to the row of the vector database 112 from which the result vector was retrieved.

In step 604, the verifier device 104 sends the random challenge vector to the prover device 110. The random challenges of the random challenge vector are therefore known by the verifier device 104 and the prover device 110 and can be used to generate the third commitment to facilitate verification of the result vector, as explained in more detail below. In this example, the random challenge vector is a set of m random field elements from F that are selected by the verifier device 104 and are optionally generated via a random number generator.

In step 606, the verifier device 104 generates the second commitment to a distance vector based on the stored first commitment, the query vector, the result vector, and the set of generators. The distance vector is concurrently generated by the prover device 110 as described below with reference to step 608. The first commitment is to the rows or data vectors of the vector database 112 and could have been previously generated and stored as explained above with reference to FIGS. 4-5, for example. Each of the rows of the vector database 112 has a length and the first commitment is a commitment vector having a length corresponding to the length of each of the rows. Additionally, each of the entries of the first commitment includes a commitment to one of the columns of the vector database 112. Advantageously, the second commitment can be generated in O(m) time if caching is used. The verifier device 104 also generates the third commitment to a random linear combination vector based on the first commitment and the random challenge vector.

In step 608, the prover device 110 generates the distance vector, to which the verifier device 104 generated the second commitment in step 606, based on the query vector, the contents of the vector database 112, and the result vector. Each entry of the distance vector indicates a relative distance from the query vector of one of the rows and the result vector. Additionally, the prover device 110 generates the random linear combination vector, to which the verifier device 104 generated the third commitment in step 606, based on the random challenge vector and the columns of the vector database 112. Thus, entries of the random linear combination vector in this example include random linear combinations of the columns for each of the rows. While steps 606 and 608 are described as being performed serially, any portion, or all, of those steps can be performed in parallel by the verifier device 104 and the prover device 110.

In step 610, the prover device 110 generates a range proof. The range proof can be generated using a method described in Bunz et al., Benedikt, "Proof-Carrying Data from Accumulation Schemes," Cryptology ePrint Archive, Paper 2020/499, 2020, which is incorporated by reference herein in its entirety, although other schemes and methods for generating the range proof can also be used. The range proof shows that each entry of the distance vector is greater than or equal to zero, indicating that none of the rows of the vector database 112 are closer to the query vector than the result vector. In this example, a cosine similarity distance metric is used to determine values of the entries of the distance vector, as indicated above, although other types of distance metrics can also be used in other examples.

In step 612, the prover device 110 generates an inner product proof. The inner product proof can be generated using a method described in Bunz et al., Benedikt, "A simplified polynomial protocol for lookup tables," Cryptology ePrint Archive, Paper 2020/315, 2020, which is incorporated by reference herein in its entirety, although other schemes and methods for generating the inner product proof can also be used.

The inner product proof shows that an inner product of the random linear combination vector and a standard basis vector is equal to one of the random linear combinations of the columns for the row corresponding to the index (i.e., the result vector). The standard basis vector is identified based on the index sent in step 602 and is in a vector space of the data vectors corresponding to the rows of the vector database 112. Optionally, the inner product proof can be batched with the range proof thereby yielding minimal additional work for the verifier device 104 and the prover device 110.

In step 614, the verifier device 104 check the range proof using the second commitment and the inner product proof using the third commitment and one of the generators used to generate the first commitment to thereby verify whether the prover device 110 has produced the correct result to the query. The generator used in the check of the inner product proof can be identified by the verifier device 104 based on the index received in step 602. If the check of the range proof confirms that each entry of the distance vector is equal to or greater than zero, then the row of the vector database corresponding to the index is at least as far from the query vector as the result vector (i.e., each of the rows of the vector database 112 is at least as far from the query vector as the result vector).

To check the inner product proof, the verifier device 104 can determine whether an inner product of the random challenge vector and the result vector is equal to one of the random linear combinations of the columns for the row corresponding to the index. If the verifier device 104 determines that the inner product of the random challenge vector and the result vector is equal to the one of the random linear combinations of the columns for the row corresponding to the index (i.e., the result vector is one of the rows), then the result vector is necessarily a data vector or row in the vector database 112.

If the verifier device 104 determines that the prover device 110 has produced the correct result to the query based on the check of the inner product and range proofs in step 614, then the verifier device 104 returns the result vector to the client device 108 in response to the query. Optionally, the verifier device 104 sends, in step 618, a tamperproof success flag along with or following the result vector. The tamperproof success flag can be indicia indicating that the result vector has been verified and the query was therefore not tampered with.

However, if the verifier device 104 determines that the inner product and/or range proof does not pass, then the verifier device 104 does not route the result vector to the client device 108, and instead sends a failure message. In other examples, the verifier device 104 can send the result vector to the client device 108 with a tamperproof unsuccessful flag, and other types of communications indicating success and/or failure of the verification on the part of the verifier device 104 can also be used in yet other examples.

Figure 7:
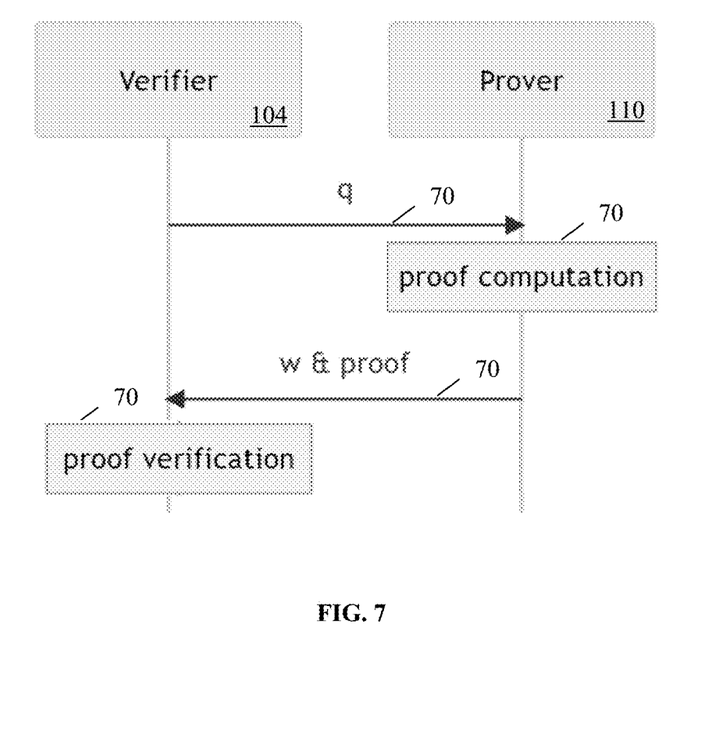
FIG. 7 is timing diagram of another exemplary method for using a stored commitment to verify a vector database query result.

Referring to FIG. 7, a timing diagram of another exemplary method for using a stored commitment to verify a vector database query result is illustrated. In this example, the operations of FIG. 6 are effectively made non-interactive for increased efficiency. In this example, the Fiat-Shamir protocol is used to similar portions of the method described and illustrated above with reference to FIG. 6. In particular, in step 700, the verifier device 104 sends the query with the query vector to the prover device 110, as in step 600 of FIG. 6.

In step 702, the prover device 110 determines the result vector and simulates the remainder of the steps of FIG. 6 performed by the prover device 110, except for the sending of the result vector in step 602 and the sending of the range and inner product proofs in steps 610 and 610, respectively. Thus, the prover device 110 simulates the steps of FIG. 6 to generate non-interactive proof(s) of the correctness of the result vector.

In step 704, the prover device 110 sends the result vector and the non-interactive proof(s) to the verifier device 104. In step 706, the verifier device checks the non-interactive proof(s) by simulating the steps of FIG. 6 performed by the verifier device after the query vector is sent to the prover device 110 in step 600. Based on the check or verification of the non-interactive proof(s), the verifier device 104 can then determine whether to return the result vector to the client device 108 and/or whether to indicate success or failure to the client device 108 in response to the query.

While the examples described and illustrated above facilitate an ENN search of the vector database 112, this technology can also be used in an ANN search of the vector database 112 for implementations in which increased performance is achieved in exchange for reduced query result accuracy. In an ANN example of this technology, the index data structure 314 is used to store indices generated and updated as new data vectors or rows are ingested into the vector database 112. The indices of the index data structure 314 each point to one of the ANN bins 316, each of which can be a separate vector database 112 or can be considered to collectively comprise the vector database 112.

The verifier device 104 generates and stores the indices to the ANN bins 316 in the index data structure 314. In some examples, the index data structure 314 can be a SQL database and the technology described and illustrated in U.S. Pat. No. 11,526,622, which is incorporated herein by reference in its entirety, can be used to verify the indices returned to the verifier device 104 from the index data structure 314 by the prover device 130 or another third-party device hosting the index data structure 314. In other examples, the verifier device 104 can store the index data structure 314 locally in the memory 202. In yet other examples, the verifier device 104 can locally store a digest instead of the entire index data structure 314, and other methods for maintaining the index data structure 314 can also be used in other examples.

In one example, locality-sensitive hashing indices are used for the indices of the index data structure 314, although other types of indexing schemes can also be used that may use other mechanisms and/or data structures in other examples. Thus, in this example, a hash (also referred to herein a second index) is used that specifies which of the ANN bins 316 each ingested data vector should be stored. Upon ingestion, the verifier device 104 generates the hash, identifies one of the ANN bins 316, updates the first commitment to the one of the ANN bins 316 that is maintained in the index data structure 314 correlated with the hash, and then sends the ingested data vector to the prover device 110 to be inserted as a row in the portion of the vector database 112 corresponding to the one of the ANN bins 316.

Upon processing queries to the vector database 112, the verifier device 104 can then generate a hash based on the received query vector to identify one of the ANN bins 316 to query and the commitment to the one of the ANN bins 316 based on the contents of the index data structure 314. The verifier device 104 then sends a query with the query vector to the prover device 110 with an indication of the identified one of the ANN bins 316 to obtain and verify a result vector as described and illustrated in detail above with reference to FIGS. 6-7. Accordingly, in this example, the ANN bins 316 are chosen such that data vectors in the same bin are likely to be close to each other, which allows for relatively fast lookup of the nearest neighbors because instead of searching all of the data vectors, the prover device 110 only needs to search the data vectors in the same bin as the query vector.

As described and illustrated by way of the examples herein, this technology more effectively and efficiently facilitates verification of query results generated from untrusted vector databases, including untrusted decentralized vector databases. This technology leverages commitments and inner product and range proofs to verify the accuracy of query results. The commitments are updatable and the query results are verified by an intermediary verifier device, for example, without requiring access by that verifier device to the data hosted by the vector database.

Having thus described the basic concept of the invention, it will be rather apparent to those skilled in the art that the foregoing detailed disclosure is intended to be presented by way of example only and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations, therefore, is not intended to limit the claimed processes to any order except as may be specified in the claims. Accordingly, the invention is limited only by the following claims and equivalents thereto.

What is claimed is:

1. A method, comprising:
    executing a query received from one or more verifiers against a vector database to generate a result vector, wherein the query comprises a query vector and the result vector is one of a plurality of data vectors in the vector database that is closest to the query vector;
    generating a range proof, an inner product proof, and an index in the vector database to the result vector; and
    returning the result vector, the index, the range proof, and the inner product proof to the one or more verifiers in response to the query to facilitate verification of the result vector.

2. The method of claim 1, further comprising storing the one of the plurality of data vectors in a row of the vector database after receiving the one of the plurality of data vectors from the one or more verifiers and before receiving the query, wherein the index corresponds to the row.

3. The method of claim 1, further comprising generating a distance vector for the plurality of data vectors based on the query vector, other contents of the vector database, and the result vector, wherein each entry of the distance vector indicates a relative distance from the query vector of the result vector and the range proof shows that each entry of the distance vector is greater than or equal to zero when the result vector is closest to the query vector.

4. The method of claim 1, further comprising generating a random linear combination vector based on a random challenge vector received from the one or more verifiers and a plurality of columns of the vector database, wherein the random linear combination vector is used to confirm the result vector is in the vector database.

5. The method of claim 4, wherein the random linear combination vector comprises a plurality of entries, each including a random linear combination of the plurality of columns for one of a plurality of rows of the vector database.

6. The method of claim 5, wherein the inner product proof shows that an inner product of the random linear combination vector and a standard basis vector is equal to one of the random linear combinations of the plurality of columns for another one of the plurality of rows corresponding to the index.

7. An apparatus, comprising first memory comprising first instructions stored thereon and at least one first processor coupled to the first memory and configured to execute the stored first instructions to:
    execute a query received from one or more verifiers against a vector database to generate a result vector, wherein the query comprises a query vector and the result vector is one of a plurality of data vectors in the vector database that is closest to the query vector;
    generate a range proof, an inner product proof, and an index in the vector database to the result vector; and
    return the result vector, the index, the range proof, and the inner product proof to the one or more verifiers in response to the query to facilitate verification of the result vector.

8. The apparatus of claim 7, wherein the at least one first processor is further configured to execute the stored first instructions to store the one of the plurality of data vectors in a row of the vector database after receiving the one of the plurality of data vectors from the one or more verifiers and before receiving the query, wherein the index corresponds to the row.

9. The apparatus of claim 7, wherein the at least one first processor is further configured to execute the stored first instructions to generate a distance vector for the plurality of data vectors based on the query vector, other contents of the vector database, and the result vector, wherein each entry of the distance vector indicates a relative distance from the query vector of the result vector and the range proof shows that each entry of the distance vector is greater than or equal to zero when the result vector is closest to the query vector.

10. The apparatus of claim 7, wherein the at least one first processor is further configured to execute the stored first instructions to generate a random linear combination vector based on a random challenge vector received from the one or more verifiers and a plurality of columns of the vector database, wherein the random linear combination vector is used to confirm the result vector is in the vector database.

11. The apparatus of claim 10, wherein the random linear combination vector comprises a plurality of entries, each including a random linear combination of the plurality of columns for one of a plurality of rows of the vector database.

12. The apparatus of claim 11, wherein the inner product proof shows that an inner product of the random linear combination vector and a standard basis vector is equal to one of the random linear combinations of the plurality of columns for another one of the plurality of rows corresponding to the index.

13. The apparatus of claim 7, further comprising the one or more verifiers, wherein the one or more verifiers comprise second memory comprising second instructions stored thereon and at least one second processor coupled to the second memory and configured to execute the stored second instructions to:
- receive the result vector, the index, the range proof, and the inner product proof from one or more provers, wherein the vector database comprises a plurality of rows and a plurality of columns;
- generate, based on a first commitment to the plurality of rows, second and third commitments to a distance vector and a random linear combination vector, respectively;
- check the range proof using the second commitment and the inner product proof using the third commitment and a generator used to generate the first commitment; and
- return the result vector after confirming the result vector is one of the plurality of rows, and each of the plurality of rows is at least as far from the query vector as the result vector, based on the check of the inner product proof and the range proof, respectively.

14. The apparatus of claim 13, wherein the at least one second processor is further configured to execute the stored second instructions to:
- receive the index from the one or more provers; and
- identify the generator based on the index.

15. A non-transitory computer-readable medium having stored thereon instructions comprising executable code that, when executed by one or more processors, causes the one or more processors to:
- execute a query received from one or more verifiers against a vector database to generate a result vector, wherein the query comprises a query vector and the result vector is one of a plurality of data vectors in the vector database that is closest to the query vector;
- generate a range proof, an inner product proof, and an index in the vector database to the result vector; and
- return the result vector, the index, the range proof, and the inner product proof to the one or more verifiers in response to the query to facilitate verification of the result vector.

16. The non-transitory computer-readable medium of claim 15, wherein the executable code, when executed by the one or more processors, further causes the one or more processors to store the one of the plurality of data vectors in a row of the vector database after receiving the one of the plurality of data vectors from the one or more verifiers and before receiving the query, wherein the index corresponds to the row.

17. The non-transitory computer-readable medium of claim 15, wherein the executable code, when executed by the one or more processors, further causes the one or more processors to generate a distance vector for the plurality of data vectors based on the query vector, other contents of the vector database, and the result vector, wherein each entry of the distance vector indicates a relative distance from the query vector of the result vector and the range proof shows that each entry of the distance vector is greater than or equal to zero when the result vector is closest to the query vector.

18. The non-transitory computer-readable medium of claim 15, wherein the executable code, when executed by the one or more processors, further causes the one or more processors to generate a random linear combination vector based on a random challenge vector received from the one or more verifiers and a plurality of columns of the vector database, wherein the random linear combination vector is used to confirm the result vector is in the vector database.

19. The non-transitory computer-readable medium of claim 18, wherein the random linear combination vector comprises a plurality of entries, each including a random linear combination of the plurality of columns for one of a plurality of rows of the vector database.

20. The non-transitory computer-readable medium of claim 19, wherein the inner product proof shows that an inner product of the random linear combination vector and a standard basis vector is equal to one of the random linear combinations of the plurality of columns for another one of the plurality of rows corresponding to the index.

\* \* \* \* \*